US012213621B2

United States Patent
Crosby

(10) Patent No.: US 12,213,621 B2
(45) Date of Patent: Feb. 4, 2025

(54) HEATED HIGH CHAIR

(71) Applicant: Johnathan Crosby, Charleston, SC (US)

(72) Inventor: Johnathan Crosby, Charleston, SC (US)

( * ) Notice: Subject to any disclaimer, the term of this patent is extended or adjusted under 35 U.S.C. 154(b) by 657 days.

(21) Appl. No.: 15/240,382

(22) Filed: Aug. 18, 2016

(65) Prior Publication Data

US 2018/0049585 A1 Feb. 22, 2018

(51) Int. Cl.
*A47J 36/24* (2006.01)
*A47D 1/00* (2006.01)
*H05B 3/20* (2006.01)

(52) U.S. Cl.
CPC .......... *A47J 36/2483* (2013.01); *A47D 1/008* (2013.01); *H05B 3/20* (2013.01); *H05B 2203/003* (2013.01); *H05B 2203/028* (2013.01)

(58) Field of Classification Search
CPC ....... A47J 36/2483; A47D 1/008; H05B 3/20; H05B 2203/003; H05B 2203/028
USPC ....... 219/520, 521, 522, 523, 526, 536, 538, 219/541, 542; 297/148–151, 180.12
See application file for complete search history.

(56) References Cited

U.S. PATENT DOCUMENTS

| | | | |
|---|---|---|---|
| 2,938,645 A | 5/1960 | McCowan | |
| 4,041,277 A | 8/1977 | Shumrak et al. | |
| 4,145,603 A | 3/1979 | Mackay et al. | |
| 5,586,800 A | * 12/1996 | Triplett | ................ A47D 1/0085 |
| | | | 297/148 |
| 6,119,996 A | 9/2000 | Connery | |
| 8,203,105 B2 | 6/2012 | Li et al. | |

* cited by examiner

*Primary Examiner* — Christopher S Kim
(74) *Attorney, Agent, or Firm* — Bold IP PLLC; Christopher Mayle

(57) ABSTRACT

A heated high chair disclosed here includes an heating element positionable within high chair, and further includes a heating element and an electrical power source. The heating element is housed within the high chair feeding member, where the high chair feeding member defines a cavity. The heating element is inserted into the cavity of high chair feeding member to transfer generated heat to an upper surface of the high chair feeding member, thereby conductively transferring heat to an upper surface of the high chair feeding member. The electrical power source is positioned adjacent to the heating element to heat the heating element, where the heat generated in the heating element sustains the heat of a food item positioned above the upper surface of the high chair feeding member.

3 Claims, 3 Drawing Sheets

HEATED HIGH CHAIR

BACKGROUND

Globally, infants and babies and toddlers eat from a high chair for years during the most important growth stages of their lives. Food items cool extremely quickly when put directly on a high chair feeding member's surface and even more rapidly when foods must be cut into very small pieces so that a child won't choke when being fed or feeding themselves from a high chair. As these foods, which are meant to be eaten warm, quickly cool, they also quickly become less palatable as they cool resulting in less efficient feeding and added stress to both parent and child during feeding times, and the majority of time eventual rejection of certain food items can happen, along with a number of different stress related peripheral issues from difficult feeding/eating sessions.

Cold food can be of negative influence on infants since they have a tendency to reject food which is not warm enough, whereby the food feels less tasty to be consumed and which gradually generates inefficient/stressful mealtimes, as well as poor appetite at mealtime do to food quickly becoming much less palatable extremely quickly after placed directly onto the feeding surface of a high chair. Growth during these early years of a child's life is extremely important and therefore there is a need for a solution or a device which is determined to eliminate one of the leading causes of food rejection by infants because of quick loss of ambient heat from the food item which is required for the food to be palatable.

Hence, there is a long felt but unresolved need for a heated high chair where a heating element can be assembled into the high chair feeding member, during manufacture of any conventional high chair meant for seating and feeding infants. The high chair feeding member surface could then effectively sustain the desired temperature in the food which is served to the infant to keep the food item that has been served directly on the high chair palatable for the infant.

SUMMARY OF THE INVENTION

The heated high chair comprising an heating element positionable within the feeding member of a high chair addresses the above mentioned need for a heat conduction apparatus which can be assembled onto a high chair during manufacture of any conventional high chair meant for seating and feeding. The high chair with heat conduction apparatus is intended to effectively sustain the heat in the food which is served to the infant directly from the high chair feeding member surface. The heating element of the heated high chair is configured to be housed within the high chair, where the high chair feeding member defines a thin cavity. The heating element is configured to be inserted into the cavity of the high chair feeding member of the high chair to transfer generated heat to an upper surface of the high chair feeding member thereby conductively transferring heat to a surface of the high chair feeding member, and the electrical power source positioned adjacent to the heating element configured to heat the heating element, wherein the heat generated in the heating element is of a predefined temperature which sustains the heat of a food item positioned on the high chair feeding member surface.

In an embodiment, the heating element heating element inserted into the cavity of the high chair feeding member, is of a generally flat wafer type material configured to conduct maximum heat at low power consumption. In an embodiment, the electrical power source is one of a battery and an A/C power supply. In an embodiment, the battery is positioned within the cavity adjacent to the heating element, and insulated from the heating element to prevent damage to the battery from heat radiation. In an embodiment, the battery pack can be either removable or permanently mounted. In an embodiment, the heated high chair further comprises a socket section configured to receive a power adapter from the A/C power supply.

In another embodiment, a heating element positionable within high chair to selectively heat the high chair feeding member surface is disclosed herein. The heating element is configured to be housed within the high chair, where the high chair feeding member defines a cavity. The heating element is inserted into the cavity of the high chair feeding member to transfer generated heat to an upper surface of the high chair feeding member, thereby conductively transferring heat to a surface of the high chair feeding member. The electrical power source is positioned adjacent to the heating element to heat the heating element, where the heat generated in the heating element sustains the heat of a food item positioned on a high chair feeding member surface.

DETAILED DESCRIPTION OF THE INVENTION

Figure 1:
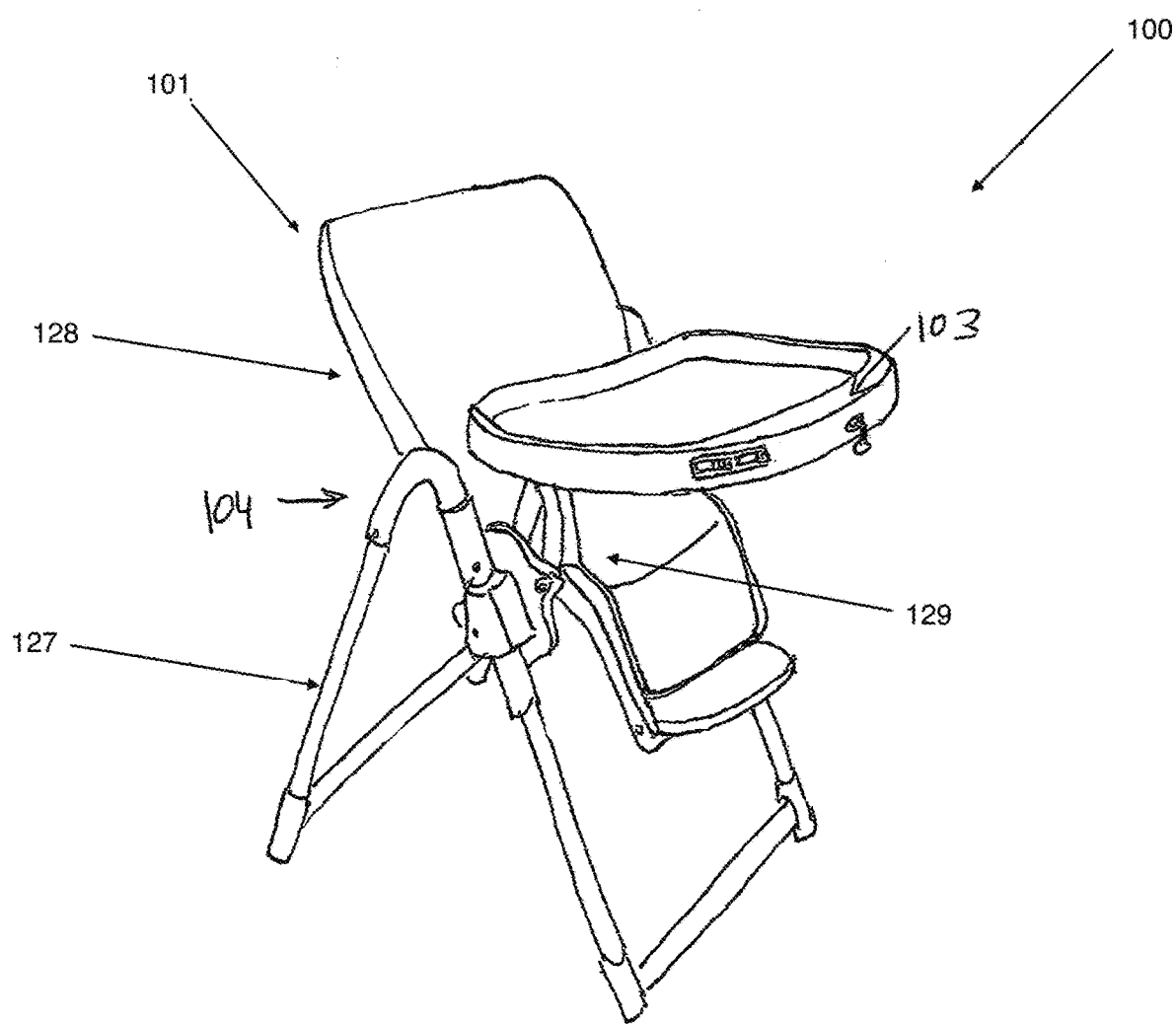
FIG. 1 exemplarily illustrates a top view of the Heated high chair.

Referring to FIG. 1, shows the exploded view and assembled view of the heat sustaining system 100, showing the high chair feeding members 101, for example, a high chair tray 103, with an insert element configured to inserted within the high chair feeding members 101. The heat sustaining system 100 comprises the insert element attachable within the high chair feeding members 101 which is configured to be attached to a high chair 104 having legs 127 extending upward to a backrest 128 and a seat 129, a heating element 106, and an electrical power source 107. The insert element is basically intended to sustain the heat of the food that's served to an infant seated on the high chair 104 and feeding from the high chair feeding members 101. In a general case, an infant may not immediately feed on the food that's served to him or her and the duration of feeding times results in cooled food as well at this age, and this can cause the food to lose the heat due to convection to the air. As the heat is lost from the food, the food further loses its softness, or the palatable quality. This food is difficult for the infant to consume because of rapid cooling of the food and the infant would also feel that the food is not tasty or soft enough to be consumed. The insertion of the insert element within the high chair tray 103 rectifies this issue of heat loss by maintaining a warm and palatable amount of heat for the food, whereby the heat is effectively sustained in the food which keeps the food item palatable for the infant.

Figure 2A:
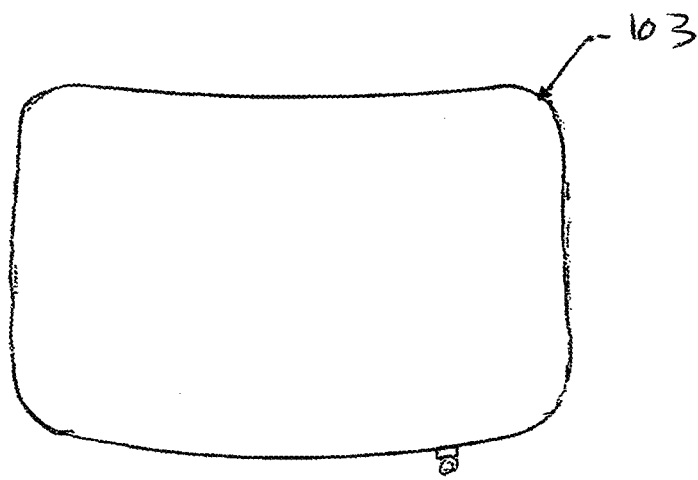
FIG. 2A exemplarily illustrates the top view of the high chair feeding member with the heating element.
Figure 2B:
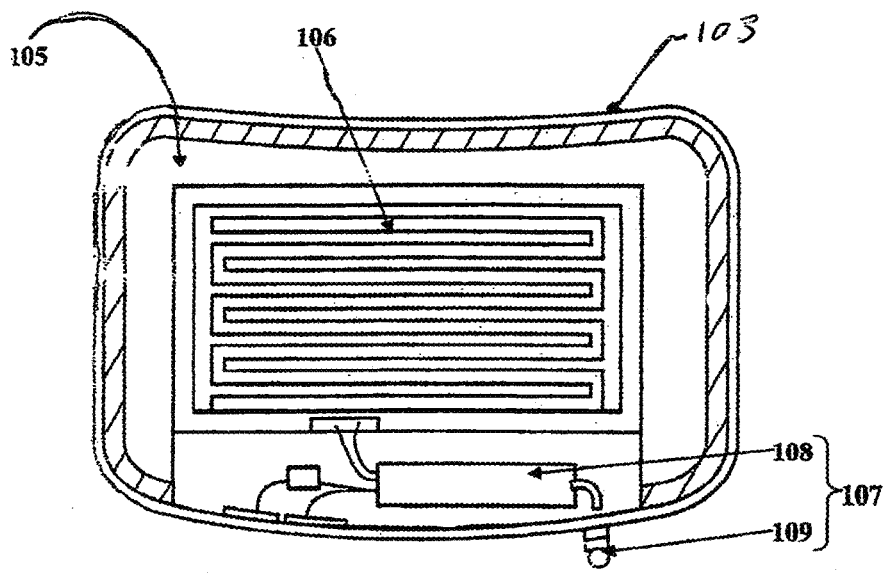
FIG. 2B exemplarily illustrates the top cutaway view of the high chair feeding member with the heating element.
Figure 2C:
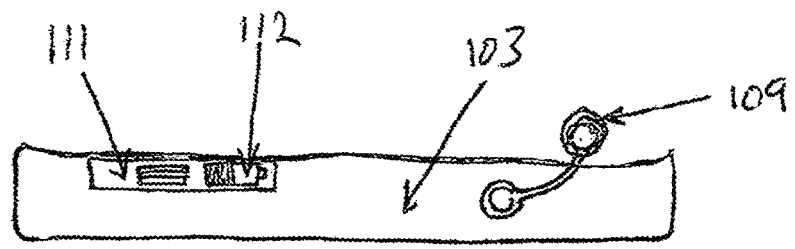
FIG. 2C exemplarily illustrates the front view of the high chair feeding member with the heating element.

FIG. 2A exemplarily illustrates the top view of the high chair feeding member 103 with heating element, FIG. 2B exemplarily illustrates the top cutaway view of the high chair feeding member 103 with heating element, and FIG. 2C exemplarily illustrates the front view of the high chair feeding member 103with heating element. The heating element is configured to be housed within the high chair feeding member 103, where the high chair feeding member defines a cavity 105. The heating element 106 is inserted into the cavity 105 of the high chair feeding member 103to transfer generated heat to an upper surface of the high chair feeding member 103, and an electrical power source 107, comprising the battery 108 and the socket section 109, positioned adjacent to the heating element 106 configured to heat the heating element 106. Here, the heat generated in the heating element 106 is of a predefined temperature which sustains the heat of a food item positioned above the upper surface of the high chair feeding member 103.

In an embodiment, the heating element 106 is of a generally flat wafer type material configured to conduct maximum heat at low power consumption, and provides uniform heat distribution, and which is inexpensive to manufacture.

Figure 2D:
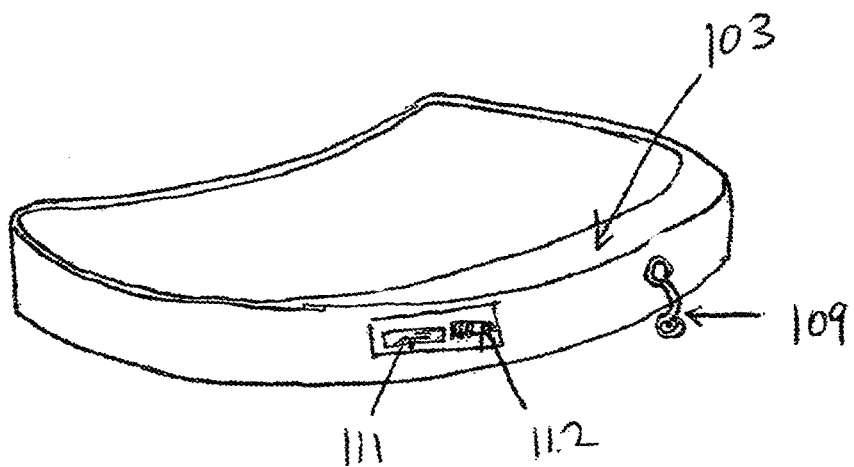
FIG. 2D exemplarily illustrates the top perspective view of the high chair feeding member with the heating element.

In an embodiment, the electrical power source 107 is one of a battery 108 and an A/C power supply. In an embodiment, the battery 108 is positioned within the cavity 105 adjacent to the heating element 106 and insulated from the heating element 106 to prevent damage to the battery 108 from heat radiation. In an embodiment, the battery 108 can be either removable or permanently mounted. The high chair feeding member 103 normally works on the battery 108 because of the portability and safety aspect of the design, where it can be used without being connected to electrical power during feedings where children are in close proximity to the power source. The temperature generated is much less below a temperature which could hurt the body of the infant. Therefore, the heated high chair provides an ambient temperature which is enough to heat or sustain the temperature of an already heated food placed on the feeding member of a high chair 103. In an embodiment, the high chair further comprises a socket section 109 configured to receive a power adapter from the A/C power supply. As shown in FIGS. 2C and 2D, there is an indicator 111 positioned frontally to the high chair feeding member 103 to indicate the temperature and power generated during the usage, and there is a battery level indicator 112 to show the amount of charge which is left in the battery 108 during usage. Heat is transferred to the high chair feeding member 103 via conduction from the heating element 106 which is heated either by the power supply from the battery 108, or by direct A/C power supply.

The foregoing examples have been provided merely for the purpose of explanation and are in no way to be construed as limiting of the present concept disclosed herein. While the concept has been described with reference to various embodiments, it is understood that the words, which have been used herein, are words of description and illustration, rather than words of limitation. Further, although the concept has been described herein with reference to particular means, materials, and embodiments, the concept is not intended to be limited to the particulars disclosed herein; rather, the concept extends to all functionally equivalent structures, methods and uses, such as are within the scope of the appended claims. Those skilled in the art, having the benefit of the teachings of this specification, may affect numerous modifications thereto and changes may be made without departing from the scope and spirit of the concept in its aspects.

I claim:

1. A heated highchair system comprising:
a highchair, wherein the highchair has a backrest and a seat extending upward from legs;
a heating element housed within a highchair feeding member of the highchair, wherein the highchair feeding member defines a cavity;
the heating element included in the cavity to transfer a generated heat to an upper surface of the highchair feeding member, thereby conductively transferring heat to the upper surface of the highchair feeding member; and
an electrical power source that is a battery insulated from the heating element and connected to the heating element and configured to provide power to the heating element, wherein the generated heat in the heating element heats a food item positioned on the upper surface of the highchair feeding member, wherein the heating element is positioned nearer to the highchair than the battery in a horizontal direction wherein the battery is positioned at an outer surface farthest away from the highchair in the horizontal direction.

2. The heated highchair system of claim 1, wherein the heating element comprises a material configured to conduct the generated heat.

3. The heated highchair system of claim 1, wherein the battery is one of a removeable battery and a permanently mounted battery powered through a socket protruding through the highchair feeding member.

* * * * *

UNITED STATES PATENT AND TRADEMARK OFFICE
CERTIFICATE OF CORRECTION

| | | |
|---|---|---|
| PATENT NO. | : 12,213,621 B2 | Page 1 of 1 |
| APPLICATION NO. | : 15/240382 | |
| DATED | : February 4, 2025 | |
| INVENTOR(S) | : Jonathan Crosby | |

It is certified that error appears in the above-identified patent and that said Letters Patent is hereby corrected as shown below:

On the Title Page

Item (71) should read: Jonathan Crosby
Item (72) should read: Jonathan Crosby

Signed and Sealed this
Sixth Day of May, 2025

Coke Morgan Stewart
*Acting Director of the United States Patent and Trademark Office*